United States Patent Office 2,725,405
Patented Nov. 29, 1955

2,725,405

SELECTIVE REDUCTION OF CHLOROBROMO-HYDROCARBONS

Edgar C. Britton and Theodore R. Keil, Midland, Mich., assignors to the Dow Chemical Company, Midland, Mich., a corporation of Delaware No Drawing. Application December 24, 1951, Serial No. 263,133

5 Claims. (Cl. 260—650)

This invention relates to a selective and partial dehalogenation of polyhalohydrocarbons and in particular concerns a method for the preparation of chlorohydrocarbons by the selective reduction of polyhalohydrocarbons containing both chlorine and bromine atoms in the same molecule.

It is known to dehalogenate halohydrocarbons by reacting the same with hydrogen in the presence of a catalyst. Arnold et al. in United States Patent 2,025,032 describe the dehalogenation of organic halides in vapors phase and point out that the dehalogenation reaction to displace the halogen atoms with hydrogen proceeds with somewhat greater difficulty in the order chlorine, bromine, and iodine. Busch and Stove (Ber. vol. 49, pages 1063–71, 1916) describe the dehalogenation of halogenated hydrocarbons and state that the reaction occurs in a quantitative manner.

We have now found that polyhalohydrocarbons containing both chlorine and bromine atoms in the same molecule can readily be selectively debrominated and reduced so as to obtain the corresponding chlorohydrocarbons by reacting a chlorobromohydrocarbon in liquid medium with hydrogen in the presence of a palladium catalyst and a halogen acid acceptor.

We have discovered that palladium in finely divided form is an unusually effective hydrogenation catalyst for the selective debromination by reduction of a chlorobromohydrocarbon. The reduction is almost entirely selective with respect to the bromine atom and the reaction can readily be carried out so as to obtain the corresponding chlorohydrocarbon in good yield. The invention permits the production of aromatic chlorohydrocarbons having one or more chlorine atoms attached to the aromatic nucleus in a predetermined position, e. g. the preparation of 3-chlorocymene, by a simple and economical process.

The reactants, i. e. the hydrogen and the polyhalohydrocarbon containing both chlorine and bromine atoms in the molecule, are employed in amounts corresponding to approximately one mole of the hydrogen per chemical equivalent proportion of bromine in the polyhalohydrocarbon. The reaction, with para-chlorobromobenzene probably takes place according to the equation:

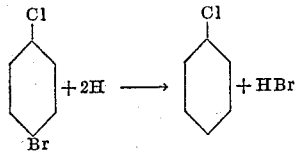

Greater or lesser proportions of hydrogen may be used, but are less satisfactory, since greater proportions of the hydrogen may result in complete dehalogenation of the polyhalohydrocarbon, while lesser amounts of hydrogen are insufficient for selective removal of all of the bromine.

The reaction is carried out in an inert liquid medium, preferably an organic liquid which is a solvent for the polyhalohydrocarbon and has a boiling point substantially different from that of the chlorohydrocarbon product so as to facilitate recovery of the same. Examples of suitable organic liquids are benzene, toluene, cyclohexane, xylene, methylcyclohexane, ethylbenzene and saturated lower aliphatic alcohols such as methyl alcohol, ethyl alcohol, or isopropyl alcohol. Mixtures of any two or more of such compounds may also be used. The reaction is carried out in the presence of a halogen acid acceptor, i. e. a neutralizing or immobilizing agent, which compound reacts with, or absorbs, the hydrogen halide formed in the reaction. Examples of suitable halogen acid acceptors are sodium hydroxide, potassium hydroxide, calcium hydroxide, sodium acetate, potassium propionate, sodium carbonate, potassium bicarbonate, and calcium carbonate. The halogen acid acceptor is employed in amount corresponding to the chemical equivalent of the hydrogen bromide theoretically obtainable in the reaction, although somewhat greater proportions may be used. Water may also be employed to absorb and immobilize the halogen acid, particularly when the reaction is carried out in a liquid medium comprising essentially a saturated lower aliphatic alcohol. The water is used in amount such that the reaction mixture is a single phase, suitably in amount corresponding to from 10 to 25 per cent by weight of the alcohol.

Finely divided palladium on charcoal is the preferred catalyst, but palladium in finely divided form and supported on other inert materials such as calcium carbonate, or diatomaceous earth, may also be used. The palladium in concentration of from 5 to 10 per cent by weight of the inert supporting material is usually employed in amount corresponding to from 0.01 to 0.1 per cent by weight of the polyhalohydrocarbon starting material, although greater amounts of the catalyst may be used.

The reaction is usually carried out by forming a mixture of the polyhalohydrocarbon and the inert reaction medium, e. g. cyclohexane or methyl alcohol, in amount corresponding to from 0.8 to 2.5 parts by weight of the reaction medium per part of the polyhalohydrocarbon, and agitating the solution together with the palladium catalyst; a suitable halogen acid acceptor, preferably sodium acetate; and hydrogen in a closed vessel or autoclave at an absolute pressure of from 10 to 100 pounds per square inch and at a reaction temperature between 10° and 80° C., preferably from 25° to 60° C. However, the reaction may be carried out at atmospheric pressure and at the reflux temperature of the reaction mixture. The reaction is discontinued when an amount of the hydrogen corresponding to approximately one mole of the hydrogen per chemical equivalent proportion of bromine in the chlorobromohydrocarbon has been consumed in the reaction. The course of the reaction can readily be followed by observing the lowering of the hydrogen pressure as the reaction proceeds.

Upon completion of the reduction reaction the mixture is filtered to remove the catalyst. The chlorohydrocarbon product may be recovered in any usual way. The reaction mixture is preferably filtered to remove the catalyst, together with other insoluble substances and the product is separated from the organic reaction medium by distillation.

The following examples illustrate ways in which the principle of the invention has been applied, but are not to be construed as limiting the invention.

*Example 1*

A mixture consisting of 123.8 grams (0.5 mole) of 2-bromo-5-chlorocymene, 100 cc. of cyclohexane, 18.5 grams (0.25 mole) of calcium hydroxide and 4 grams of 5 weight per cent palladium on charcoal hydrogenation catalyst was placed in the reaction flask of a Parr hydrogenation apparatus. The mixture was agitated at room temperature and maintained in contact with hydrogen at from 22 to 14 pounds per square inch gauge pressure for a period of 5.5 hours. Approximately 0.5 gram mole of hydrogen was absorbed in the reaction. The mixture was removed from the bottle and filtered to remove the catalyst. The filtrate was distilled. There was obtained 77.4 grams (0.46 mole) of 3-chlorocymene boiling at 103°–107° C. at 25 millimeters absolute pressure and having an index of refraction $n_D^{20}=1.5172$. The yield of product was 92 per cent.

*Example 2*

A charge of 95.7 grams (0.5 mole) of 1-bromo-4-chlorobenzene in 150 cc. of cyclohexane was hydrogenated by procedure similar to that described in Example 1, except that the reaction was carried out at temperatures between 50° and 55° C. over a period of 1.5 hours. Approximately 0.43 gram mole of hydrogen was absorbed in the reaction. The reaction mixture was filtered and the filtrate distilled. There was separated 36.5 grams (0.35 mole) of chlorobenzene boiling at 130°–132° C. and having an index of refraction $n_D^{25}=1.5211$. The residue consisted of 13 grams of unreacted 1-bromo-4-chlorobenzene.

*Example 3*

A mixture consisting of 85.7 grams (0.5 mole) of 1-bromo-3-chloro-2-methylpropane, 100 cc. of methyl alcohol, 25 cc. of water, 41 grams (0.5 mole) of anhydrous sodium acetate and 3.4 grams of a hydrogenation catalyst consisting of 5 per cent by weight of finely divided palladium supported on charcoal, was placed in the reaction bottle of a Parr low pressure hydrogenation apparatus. The mixture was agitated and maintained at temperatures between 25° and 60° C. while in contact with hydrogen at a pressure of 39 pounds per square inch gauge, over a reaction period of 2.3 hours. Approximately 0.09 gram mole of hydrogen was absorbed in the reaction. The bottle was opened and an additional 6.8 grams of the 5 weight per cent palladium on charcoal catalyst added thereto. The reaction was continued at a temperature of 60° C. for a period of 10 hours longer. A total of approximately 0.24 gram mole of hydrogen was consumed in the reaction. Thereafter the mixture was removed from the bottle and was washed with water. The aqueous and the organic layers were separated and the latter was fractionally distilled. The product consisted of 1-chloro-2-methylpropane and unreacted 1-bromo-3-chloro-2-methylpropane. The conversion was 50.6 per cent. The yield of 1-chloro-2-methylpropane was 54.7 per cent, based on the 1-bromo-3-chloro-2-methylpropane reacted.

Other modes of applying the principle of the invention may be employed instead of those explained, change being made as regards the method herein employed, provided the step or steps stated in any of the following claims or the equivalent of such stated step or steps be employed.

We claim:

1. A method of making a chlorohydrocarbon, which method comprises selectively debrominating a chlorobromohydrocarbon selected from the group consisting of the aliphatic and aromatic chlorobromohydrocarbons, by reacting the chlorobromohydrocarbon with approximately one molecular equivalent of hydrogen per chemical equivalent of the bromine initially present in the chlorobromohydrocarbon while dissolved in an inert liquid medium and in the presence of a palladium catalyst and a halogen acid acceptor.

2. A method of making a chlorohydrocarbon as described in claim 1 wherein the reaction is carried out in contact with hydrogen at an absolute pressure of from 10 to 100 pounds per square inch.

3. A method of making an aromatic chlorohydrocarbon, which method comprises selectively debrominating an aromatic chlorobromohydrocarbon by reacting the chlorobromohydrocarbon with approximately one molecular equivalent of hydrogen per chemical equivalent of the bromine initially present in the aromatic chlorobromohydrocarbon while dissolved in an inert liquid medium and in the presence of a palladium catalyst and a halogen acid acceptor.

4. A method of making 3-chlorocymene which consists in reacting 2-bromo-5-chlorocymene with approximately one molecular equivalent of hydrogen in the presence of a palladium on charcoal hydrogenation catalyst and a halogen acid acceptor while the 2-bromo-5-chlorocymene is dissolved in a liquid reaction medium.

5. A method of making 3-chlorocymene as described in claim 4 wherein the liquid reaction medium is cyclohexane and the halogen acid acceptor is sodium acetate.

References Cited in the file of this patent

UNITED STATES PATENTS

| 2,025,032 | Arnold et al. | Dec. 24, 1935 |
| 2,560,950 | Head | July 17, 1951 |

OTHER REFERENCES

Busch et al.: "Ber. der deut. Chem. Gesell.," vol. 62B, pages 2612–20, (1929).